(12) United States Patent
Yokoyama et al.

(10) Patent No.: US 11,887,631 B2
(45) Date of Patent: Jan. 30, 2024

(54) INFORMATION PROCESSING DEVICE AND INFORMATION PROCESSING METHOD

(71) Applicant: SONY GROUP CORPORATION, Tokyo (JP)

(72) Inventors: Ryo Yokoyama, Tokyo (JP); Takeshi Ogita, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/774,547

(22) PCT Filed: Oct. 29, 2020

(86) PCT No.: PCT/JP2020/040561
§ 371 (c)(1),
(2) Date: May 5, 2022

(87) PCT Pub. No.: WO2021/095536
PCT Pub. Date: May 20, 2021

(65) Prior Publication Data
US 2022/0392496 A1 Dec. 8, 2022

(30) Foreign Application Priority Data
Nov. 12, 2019 (JP) ................................ 2019-204441

(51) Int. Cl.
*G06F 3/01* (2006.01)
*G11B 27/00* (2006.01)
(Continued)

(52) U.S. Cl.
CPC .................................. *G11B 27/10* (2013.01)

(58) Field of Classification Search
CPC ......... G06F 3/01; G11B 27/10; H04N 21/431; H04N 21/44; H04N 13/00; H04N 2213/00; H04N 23/00
(Continued)

(56) References Cited

U.S. PATENT DOCUMENTS

2003/0193616 A1* 10/2003 Baker .............. H04N 21/23892
348/E7.086
2005/0289637 A1* 12/2005 Burke .................. H04N 9/8042
725/138
(Continued)

FOREIGN PATENT DOCUMENTS

| CN | 110892734 A | 3/2020 |
| CN | 110915231 A | 3/2020 |

(Continued)

OTHER PUBLICATIONS

International Search Report and Written Opinion of PCT Application No. PCT/JP2020/040561, dated Jan. 19, 2021, 09 pages of ISRWO.

*Primary Examiner* — Daquan Zhao
(74) *Attorney, Agent, or Firm* — CHIP LAW GROUP

(57) ABSTRACT

The present technology relates to an information processing device, an information processing method, and a program capable of providing video and sound in a synchronized state. An information processing device includes a determination unit that determines whether it is content in which sound is delayed with respect to video, and a processing unit that delays the video by a predetermined period and plays the video when the determination unit determines that it is the content in which the sound is delayed with respect to the video. The processing unit delays and plays the video so that the video when a sound source produces the sound is synchronized with the sound. The predetermined period corresponds to a period by which the sound is delayed. The (Continued)

present technology can be applied to an information processing device that processes video.

13 Claims, 17 Drawing Sheets

(51) Int. Cl.
*G11B 27/10* (2006.01)
*H04N 21/44* (2011.01)
*H04N 13/00* (2018.01)

(58) Field of Classification Search
USPC ............... 386/207, 208, 201, 210, 223, 239
See application file for complete search history.

(56) References Cited

U.S. PATENT DOCUMENTS

| | | | |
|---|---|---|---|
| 2008/0204420 A1* | 8/2008 | Dunnigan | G06F 3/04886 345/173 |
| 2009/0207277 A1* | 8/2009 | Kurihara | H04N 23/531 348/E5.009 |
| 2012/0057006 A1* | 3/2012 | Joseph | H04N 13/302 348/51 |
| 2015/0037000 A1 | 2/2015 | Brinkley | |
| 2020/0312374 A1* | 10/2020 | Olofsson | G11B 27/11 |

FOREIGN PATENT DOCUMENTS

| | | |
|---|---|---|
| EP | 3654665 A1 | 5/2020 |
| EP | 3654666 A1 | 5/2020 |
| JP | 2017-103542 A | 6/2017 |
| WO | 2019/013056 A1 | 1/2019 |

\* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/040561 filed on Oct. 29, 2020, which claims priority benefit of Japanese Patent Application No. JP 2019-204441 filed in the Japan Patent Office on Nov. 12, 2019. Each of the above-referenced applications is hereby incorporated herein by reference in its entirety.

TECHNICAL FIELD

The present technology relates to an information processing device, an information processing method, and a program, for example, an information processing device, an information processing method, and a program capable of presenting video and sound without any sense of strangeness.

BACKGROUND ART

For example, when watching a sound and a video of a sound source that produces the sound, the sound may reach the viewer later than the video due to the difference between the velocity of light and the sound velocity. Such a delay in sound becomes more pronounced as the distance from the sound source increases.

PTL 1 proposes adjusting the output timing of a tactile device in consideration of the delay in arrival of sound when the tactile device that gives a tactile sensation to a user is used.

CITATION LIST

Patent Literature

[PTL 1]
WO 2019/013056 A1

SUMMARY

Technical Problem

As described above, when the sound and the video of the sound source that produced the sound are watched, the sound may arrive later than the video. Such a delay in sound, in other words, a mismatch between video and sound, may contribute to a sense of strangeness to the viewer.

The present technology has been made in view of such a situation, and is intended to provide video and sound without any sense of strangeness.

Solution to Problem

An information processing device according to an aspect of the present technology includes: a determination unit that determines whether it is content in which sound is delayed with respect to video; and a processing unit that delays the video by a predetermined period and plays the video when the determination unit determines that it is the content in which the sound is delayed with respect to the video.

An information processing method according to an aspect of the present technology causes an information processing device that processes video to execute: determining whether it is content in which sound is delayed with respect to video; and delaying the video by a predetermined period and plays the video when it is determined that it is the content in which the sound is delayed with respect to the video.

A program according to an aspect of the present technology causes a computer to execute: determining whether it is content in which sound is delayed with respect to video; and delaying the video by a predetermined period and plays the video when it is determined that it is the content in which the sound is delayed with respect to the video.

In the information processing device, the information processing method, and the program according to one aspect of the present technology, when the content has a sound delayed with respect to a video, the video is played with a delay of a predetermined time.

Note that the information processing device may be an independent device or may be an internal block constituting a single device.

The program can be provided by transmitting via a transmission medium or by recording on a recording medium.

DESCRIPTION OF EMBODIMENTS

Modes for embodying the present technology (hereinafter referred to as "embodiments") will be described below.

Configuration of Information Processing System

The present technology can be applied to a system that generates content including video and sound and plays the generated content. The video and sound can be edited so that the user does not feel a sense of strangeness, and the edited content can be applied to a system for playing back the edited content.

In the following description, the content is content including video and sound. The content may be content in which either or both of the video and sound is provided directly or indirectly to the viewer.

Being provided directly to the viewer means being provided to the viewer without any processing, and being provided indirectly means being provided to the viewer after being subject to certain processing.

For example, sound being provided directly to the viewer means that the sound produced by the sound source reaches the viewer's ears without any processing, and the sound being provided indirectly to the viewer means that the sound produced by the sound source reaches the viewer's ears after being subject to certain processing such as an effect.

As will be described later, the video is provided to the viewer with a predetermined delay amount with respect to the sound, and such delayed video being provided to the viewer is an example of a case where video is provided indirectly to the viewer.

Figure 1:
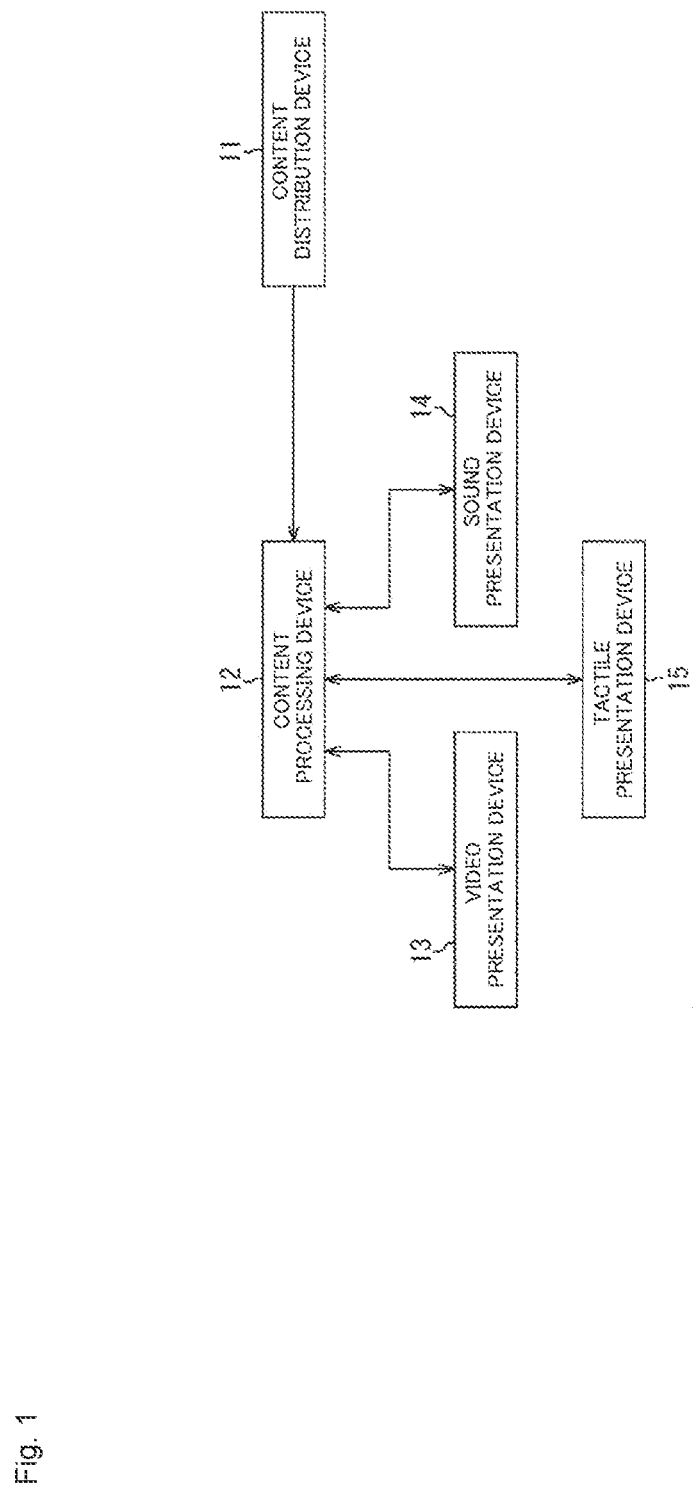
FIG. 1 is a diagram showing a configuration of an embodiment of a system to which the present technology is applied.

FIG. 1 is a diagram showing a configuration of an embodiment of an information processing system that processes content to which the present technology is applied. The information processing system includes a content distribution device 11, a content processing device 12, a video presentation device 13, a sound presentation device 14, and a tactile presentation device 15.

The content distribution device 11 distributes content. Content is distributed over a network or as a television broadcast. The content may be distributed by being recorded on a recording medium.

The content processing device 12 receives and processes the content distributed from the content distribution device 11. The content processing device 12 is a television receiver, a personal computer (PC), a smartphone, or the like. The communication between the content distribution device 11 and the content processing device 12 may be wired or wireless.

The content processing device 12 itself may have a function of generating content. For example, the content processing device 12 may have a camera and may be configured to process the video photographed by the camera as content. For example, as will be described later, the content processing device 12 may be AR glasses (augmented reality glasses) or the like.

The video presentation device 13 is a device that presents a video based on video data included in the content processed by the content processing device 12 to the user. The video presentation device 13 is, for example, a monitor, a projector, an HMD (Head Mounted Display), or the like.

The sound presentation device 14 is a device that presents a sound based on sound data included in the content processed by the content processing device 12 to the user. The sound presentation device 14 is a speaker, an earphone, or the like.

The tactile presentation device 15 is a device that presents vibrations synchronized with a video and a sound to the user. The tactile presentation device 15 is, for example, a wristband, a glove, a vest, a controller, or the like in which an oscillator is incorporated.

The content processing device 12, the video presentation device 13, and the sound presentation device 14 may be configured as one device, and may be configured as a television receiver, a personal computer (PC), a smartphone, or the like. The tactile presentation device 15 may also be incorporated in one device. For example, a smartphone or the like has a vibration function, and a device that realizes the vibration function may be used as the tactile presentation device 15.

Figure 2:
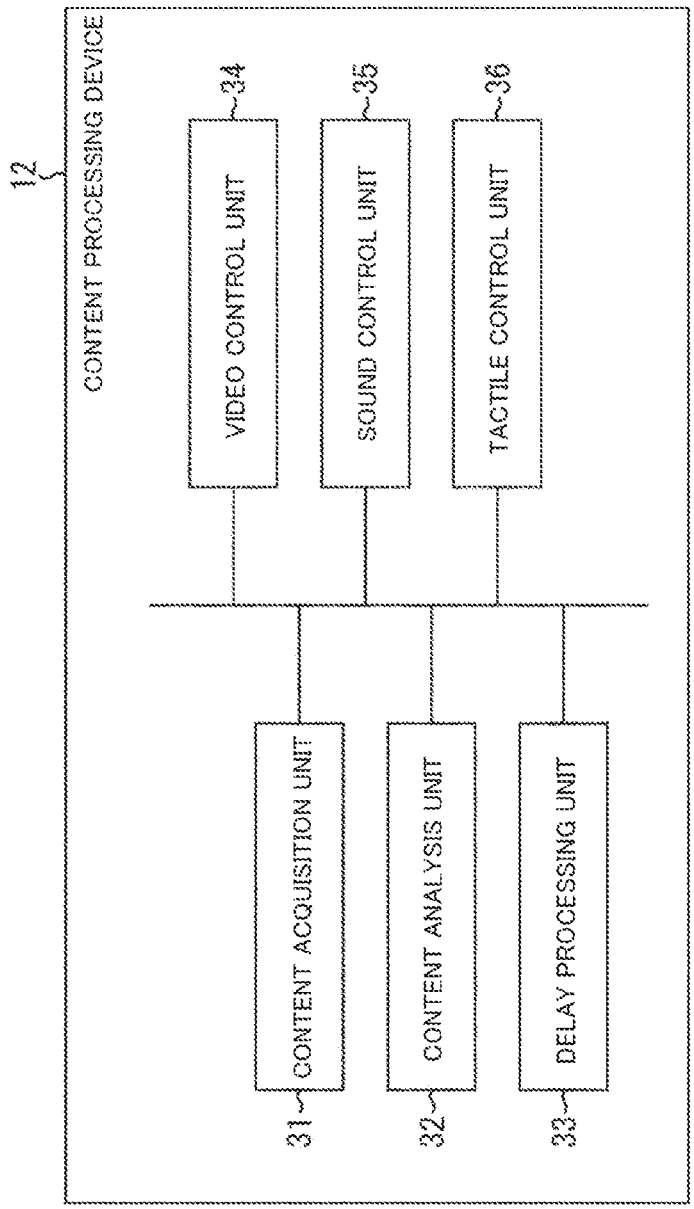
FIG. 2 is a diagram showing a configuration of an embodiment of a content processing device to which the present technology is applied.

FIG. 2 is a diagram showing a functional configuration example of the content processing device 12. The content processing device 12 includes a content acquisition unit 31, a content analysis unit 32, a delay processing unit 33, a video control unit 34, a sound control unit 35, and a tactile control unit 36.

The content acquisition unit 31 controls the reception of the distributed content, and acquires the video photographed by the camera provided therein as the content. When a sound collecting device such as a microphone is provided, the content acquisition unit 31 also acquires the sound collected by the sound collecting device. The content whose acquisition is controlled by the content acquisition unit 31 is supplied to the content analysis unit 32.

The content analysis unit 32 analyzes the content supplied from the content acquisition unit 31. The content analysis unit 32 mainly performs analysis for determining whether the content includes a delay.

In order to determine whether the content includes a delay, the content analysis unit 32 analyzes, for example, video data to estimate the distance to the subject, or analyzes sound data to classify sound by type.

When a sensor for measuring a distance or the like is provided, the information obtained from such a sensor can be used as information for determining whether the content includes a delay. In such a configuration, the content analysis unit 32 uses the information from the sensor to analyze whether the content acquired by the content acquisition unit 31 is content including a delay.

The analysis result obtained by the content analysis unit 32 is supplied to the delay processing unit 33.

The delay processing unit 33 adjusts the amount of delay in the video using the analysis result obtained by the content analysis unit 32. As will be described later, a process of delaying the image is performed so that the image in which the video and the sound are synchronized is presented. Processing related to this delay is performed in the delay processing unit 33. When the delay processing unit 33 is configured to delay the sound, the delay processing unit 33 also adjusts the delay amount of the sound.

When the delay amount is set by the delay processing unit 33, the video control unit 34 performs control so that the video delayed by the delay amount is presented by the video presentation device 13 (FIG. 1).

When the delay amount related to the sound is set by the delay processing unit 33, the sound control unit 35 performs control so that the sound delayed by the delay amount is presented by the sound presentation device 14 (FIG. 1). The tactile control unit 36 performs control so that a tactile sensation synchronized with the sound is presented by the tactile presentation device 15 (FIG. 1).

The present technology can be applied to the content processing device 12 that is not configured to control the sound presentation device 14 and the tactile presentation device 15, and the content processing device 12 may be configured to not include the sound control unit 35 and the tactile control unit 36.

The tactile data supplied to the tactile control unit 36 is supplied from the content distribution device 11 (FIG. 1) together with the content. Alternatively, the tactile data may be generated by the content analysis unit 32 analyzing the video data and the sound data.

Outline of Processing of Content Processing Device

The outline of the processing executed by the content processing device 12 will be described. Here, a case where the content is the video of fireworks will be described as an example.

The fireworks are launched into the sky and make a loud noise when opened. Here, this sound is expressed by an imitative sound called "dawn". Audiences may produce the joyful sound to watch the open fireworks.

Figure 3:
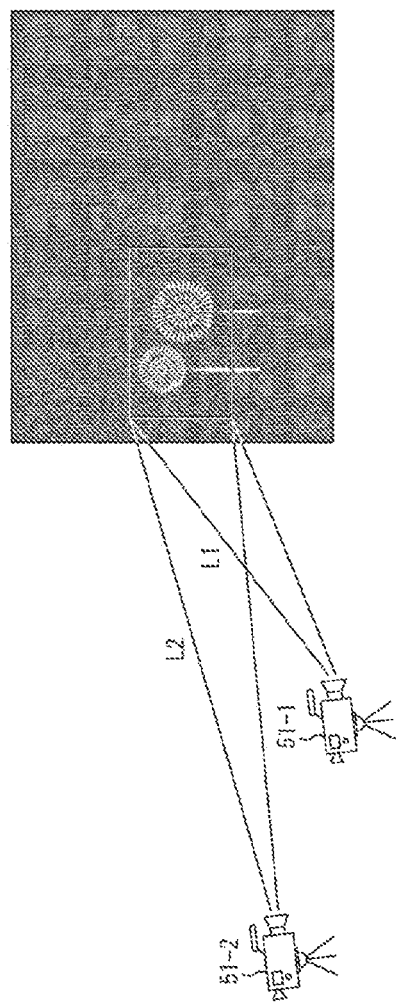
FIG. 3 is a diagram for explaining content including a delay.

As shown in FIG. 3, a case where fireworks are photographed by a camera 51-1 and a camera 51-2 will be assumed. The camera 51-1 photographs the fireworks at a distance L1 from the blooming fireworks, and the camera 51-2 photographs the fireworks at a distance L2 from the blooming fireworks. The distance L1 is located closer than the distance L2. That is, the relationship of distance L1 distance L2 is satisfied.

When comparing the video of fireworks and the sound of fireworks, the video reaches the camera 51 at the velocity of light and the sound reaches the camera 51 at the sound velocity, so that the video reaches the camera 51 earlier than the sound. When the fireworks bloom, the video of the blooming fireworks reaches the camera 51 almost instantly and is photographed. However, the sound generated when the fireworks bloom reaches the camera 51 later than the video and is recorded. The time taken for the sound to reach increases as the distance increases.

This is true not only when the camera 51 is photographing fireworks, but also when there is an spectators instead of the camera 51. That is, when the fireworks bloom, the video of the blooming fireworks reaches the spectators almost instantly and is seen. However, the sound generated when the fireworks bloom reaches the spectators later than the video and is heard.

Figure 4:
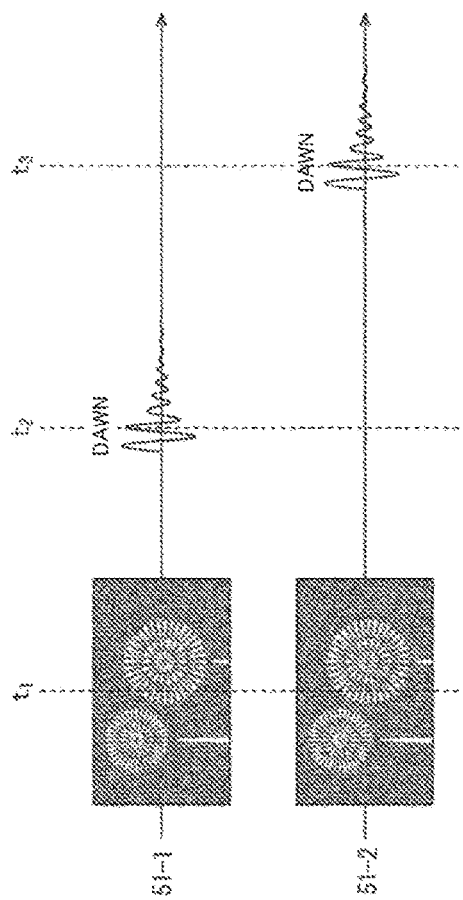
FIG. 4 is a diagram for explaining content including a delay.

FIG. 4 is a diagram showing the relationship between the video and the sound reaching the camera 51 (spectators). The fireworks at the time of blooming are photographed by the camera 51-1 and the camera 51-2 at almost the same time at time t1. The camera 51-1 collects the sound of fireworks at the time of blooming at time t2. At time t3, which is later than time t2, the camera 51-2 collects the sound of fireworks at the time of blooming.

Even if the cameras are photographing the same fireworks, the arrival time of the sound is different depending on the distance from the fireworks. The spectators watching the fireworks at the camera 51-1 will hear the sound of the fireworks blooming when a period corresponding to (time t2−time t1) has passed from the video when the fireworks bloom. The spectators watching the fireworks at the camera 51-2 hears the sound of the fireworks blooming when a period corresponding to (time t3−time t2) has passed from the video when the fireworks bloom.

The spectators (camera 51) does not experience the video and sound at the same time even if the video and sound are acquired when the fireworks bloom. In other words, the video of the fireworks and the sound of the fireworks reach the spectators (camera 51) in an offset manner. The farther from the fireworks, the greater the offset between the video and the sound.

Even if the spectators is watching the fireworks in real time, they may not be able to experience the video and sound of the fireworks at the same time, which may lead to the loss of realism.

The same applies when a viewer is watching the content including the video and sound acquired by the camera 51. When the viewer watches the fireworks content acquired by the camera 51, the viewer may feel a sense of offset between the video and the sound more.

When the camera 51 photographs the fireworks and makes the spectators watch the fireworks, the camera 51 often provides the spectators (viewer) with the video photographed in the magnified state of the fireworks by zooming to the fireworks.

Photographing fireworks in a zoomed state is equivalent to photographing fireworks nearby. That is, even if the video is fireworks photographed nearby, the sound is fireworks collected at a distance, and there is a possibility that the offset between the video and the sound becomes large.

Such an offset causes the loss of realism as in the above-described case. In addition, since the viewer watches the magnified fireworks, he/she may not be able to grasp the sense of distance from the fireworks, and may feel a sense of strangeness because the sound is heard with a delay.

In the following description, the process for eliminating such an offset between the video and the sound and providing the user (the spectators, the viewer, and the like are collectively referred to as the user) in a state where the video and the sound are synchronized will be described.

First Processing for Synchronization of Video and Sound

As the first processing for synchronizing the video and sound, for example, a case where, when the user is watching the fireworks in real time in a place where the fireworks can be seen, the video and sound at the timing of blooming of the fireworks are presented to the user in a synchronized manner regardless of the distance between the fireworks and the watching position will be described.

For example, a case where the user wears a wearable device called AR glasses or the like and is watching fireworks will be assumed. In this example, a case where the AR glasses are the content processing device 12 shown in FIG. 2 will be described as an example. For example, the content processing device 12 as AR glasses has an exterior configuration as shown in FIG. 5.

Figure 5:
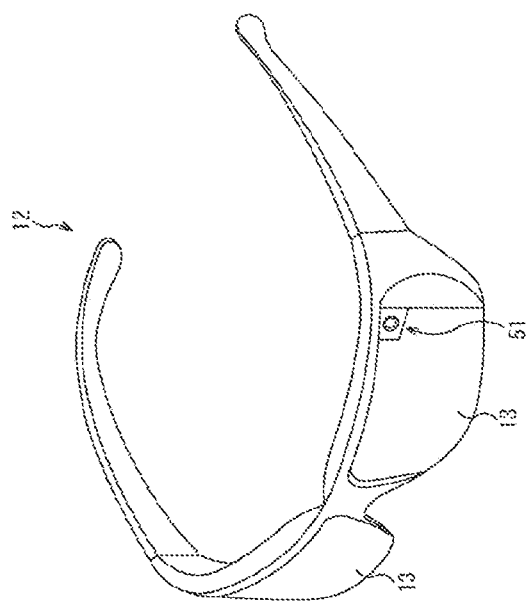
FIG. 5 is a diagram showing a configuration example of the appearance of AR glasses.

As shown in FIG. 5, the AR glasses are a wearable terminal having an eyeglasses shape. The content processing device 12 as AR glasses shown in FIG. 5 has an eyeglasses shape as a whole, and includes the video presentation device 13 and the camera 51.

The video presentation device 13 corresponds to the lens portion of the eyeglasses, and for example, the entire portion is configured as a transmissive display. Therefore, the video presentation device 13 transparently displays an annotation (virtual object) so as to be superimposed on the image (real object) in the real world that the user is directly watching.

The camera 51 is provided at the end of the video presentation device 13 corresponding to the left eye of the user wearing the AR glasses, and captures an image of the real space included in the user's field of view. The camera 51 is configured using a solid-state image sensor such as a CCD (Charge Coupled Device) image sensor or a CMOS (Complementary Metal Oxide Semiconductor) image sensor. The sensors each may be provided plurally. That is, the camera 51 may be configured as a stereo camera.

The video presentation device 13 may display an image acquired by the camera 51 and may display an annotation so as to be superimposed on the image. In the present embodiment, as will be described later, it is sufficient that the image acquired by the camera 51 is displayed on the video presentation device 13, and it is not essential that the annotations are superimposed and displayed.

Although not shown, in the AR glasses as the content processing device 12, various sensors, buttons, speakers, and the like may be housed or mounted in the housing corresponding to the frame of the eyeglasses.

The shape of the AR glasses is not limited to the shape shown in FIG. 5, but various shapes such as a hat shape, a belt shape fixed around the user's head, and a helmet shape covering the entire head of the user can be used. Here, the description will be continued by taking AR glasses as shown in FIG. 5 as an example, but the technology according to the present disclosure can be applied to HMD (Head Mounted Display) in general.

The content processing device 12 as AR glasses performs processing as described with reference to FIG. 6. The content processing device 12 photographs fireworks with the camera 51 (FIG. 5). It is assumed that the fireworks bloom at time t11 and the blooming fireworks are photographed by the camera 51. When the fireworks bloom at time t11, the sound produced at that time reaches the user at time t12.

There is an offset of period T11 (=time t12−time t11) between the time when the video arrives at the user and the time when the sound arrives. The content processing device 12 shifts the video by this offset and presents it to the user. That is, in this case, the sound is delayed by the period T11 with respect to the video, and the video is delayed by the delay of this sound and is presented to the user.

The content processing device 12 provides the user with the video photographed by the camera 51 from time t12. The content processing device 12 masks the video in the period (period T11) from time t11 to time t12 so that the video is not supplied to the user.

The content processing device 12 photographs fireworks from time t11, masks the video in the period from time t11 to time t12, and starts reproducing the photographed fireworks from time t12.

The video is masked, for example, by presenting the user with the video taken before time t11, which is the video before the fireworks go up. Then, at time t12, the video of the fireworks that bloomed at time t11 is provided to the user. Then, at time t12, the sound of the fireworks that bloomed at time t11 reaches directly the user.

In this example, the video is subject to processing called delay and indirectly provided to the user, whereas the sound is directly provided to the user without any processing. By utilizing the sound as it is and delaying the video in this way, a video that is synchronized with the sound is provided.

The user will be provided with the video and sound of the fireworks that bloomed at time t12 at the same time. By providing the video and sound at the same time in this way, the user can experience a more realistic feeling, and a spontaneous experience with less strangeness becomes possible.

Figure 6:
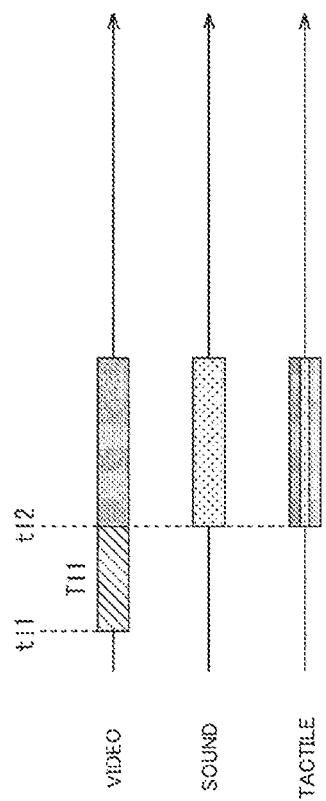
FIG. 6 is a diagram for explaining a delay in video.

As shown in FIG. 6, when the tactile sensation is provided by the tactile presentation device 15 (FIG. 1), the presentation starts at time t12. That is, in this case, the tactile sensation (vibration) is presented to the user in accordance with the sound.

The processing of the content processing device 12 that performs such processing will be described with reference to the flowchart shown in FIG. 7.

In step S11, the content acquisition unit 31 (FIG. 2) acquires content data. In this case, the content data is the data of the video taken by the camera 51 (FIG. 5). When the content acquisition unit 31 includes a microphone and is configured to collect sound, sound data may be acquired as content data.

In step S12, the content analysis unit 32 analyzes the content data acquired by the content acquisition unit 31. This analysis is an analysis for determining whether the content includes a delay.

For example, if the content data is video data, the subject that appears as the video based on the video data is identified, and whether there is a possibility that the subject is offset from the sound when the subject is photographed is determined. For example, when it is identified that fireworks are photographed as a subject, it is determined that the content includes a delay. A database for making such a determination may be provided, and the determination may be made with reference to such a database.

The determination may be performed using the video data acquired by the camera 51 and the sound data acquired by the microphone (not shown). For example, the determination may be performed by extracting the subject obtained by analyzing the video data and the sound estimated to have been produced by the subject as a sound source by analyzing the sound data, and determining whether there is an offset between the time of photographing when the sound source produces sound and the time when the sound is collected.

The video data may be analyzed to calculate the distance to the subject, and it may be determined that the content includes a delay when the distance to the subject is a predetermined distance or larger, for example, when the distance is equal to or larger than the distance that the sound travels in one second.

In step S13, it is determined whether the analysis result in step S12 shows that the content includes a delay. This determination may be performed by the content analysis unit 32, or may be performed by the delay processing unit 33 receiving the analysis result supplied from the content analysis unit 32.

If it is determined in step S13 that the content does not include a delay, the process proceeds to step S14. In this case, since the content does not include a delay, the content (video data) acquired by the content acquisition unit 31 is supplied to the video control unit 34 and provided by the video presentation device 13 without delay.

On the other hand, if it is determined in step S13 that the content includes a delay, the process proceeds to step S15. In step S15, the video is masked. For example, the video control unit 34 performs the video masking by temporarily stopping the presentation of the video in the video presentation device 13 and controlling the display so that the image displayed at that time is displayed continuously, that is, a still image is displayed. Alternatively, the video control unit 34 may display a black screen.

While the video masking is being executed, in step S16, the delay processing unit 33 executes a delay amount setting process. The delay amount corresponds to the period T11 described with reference to FIG. 6, and is an amount for shifting the start time of the playback of the video so that the video is synchronized with the sound. The delay amount setting process executed in step S16 will be described with reference to the flowchart of FIG. 8.

In step S31, the maximum distance included in the video is estimated or measured. The video data is analyzed, the subject in the video is identified, and the distance to the subject is estimated. For example, a stereo camera is used to photograph a video, and the distance to the sound source is estimated by image recognition using the video data obtained from the stereo camera.

Alternatively, the distance to the sound source may be measured by measuring the distance using an array of microphones. Alternatively, a Doppler sensor may be used to measure the distance to the sound source.

For distance estimation and measurement, a plurality of estimation methods and measurement methods may be combined to determine the distance to the sound source. When a plurality of subjects are detected, the distances to respective subjects are estimated or measured (hereinafter, it is described as estimated, but it also include measurement), and the farthest distance among them is extracted.

The process of step S31 may be performed using the information obtained in the process of step S12. Specifically, for example, when it is determined in step S12 (FIG. 7) whether the content includes a delay, the subject is detected, the distance to the subject is calculated to make the determination, or the distance to the subject is measured to make the determination based on the distance.

In step S31, the maximum distance included in the video is estimated. This estimated maximum distance is referred to as the maximum distance Lmax. In step S32, a video delay amount is set according to the maximum distance. For example, the video delay amount t0 is calculated by the following equation (1).

$$\text{Delay amount } t0 = (\text{Maximum distance } L\text{max})/(\text{Sound velocity } v) \quad (1)$$

Equation (1) is an equation for calculating the delay amount t0 by dividing the maximum distance Lmax by the sound velocity v.

It should be noted here that when a plurality of subjects are detected, the farthest distance is extracted and the delay amount for that distance is calculated. However, when a plurality of subjects are detected, the delay may be calculated for each of those subjects.

Figure 8:
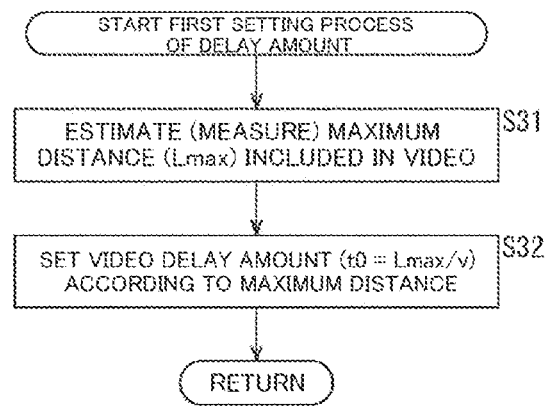
FIG. 8 is a flowchart for explaining details of a delay amount setting process.

Here, the case where the delay amount is calculated by executing the processing of the flowchart shown in FIG. 8 has been described as an example, but the delay amount may be calculated by another method (calculation formula).

For example, the subject and the delay amount may be set in advance, and for example, when it is determined that the subject is fireworks, the delay amount set for the fireworks may be applied.

Figure 7:
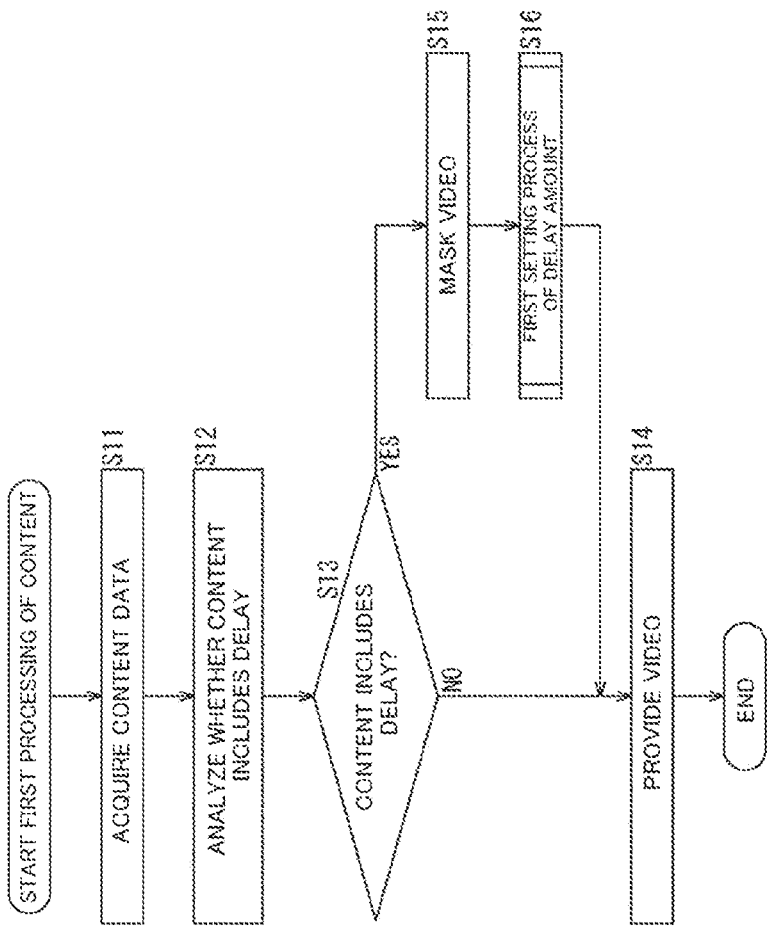
FIG. 7 is a flowchart for explaining the first processing of the content.

When the video delay amount t0 is set in step S32, the process proceeds to step S14 (FIG. 7). In step S14, the video delayed by the set delay amount t0 is provided. By delaying the start of providing the video by the delay amount t0, the video synchronized with the sound delivered to the user in real time is provided.

By shifting the playback start time of the video in this way, it is possible to provide a video that is synchronized with the sound.

In this way, the set delay amount can be used until the type of content changes, in other words, until the subject being photographed changes. In this case, the processing of the flowchart shown in FIG. 7 is performed, for example, after the photographing of the fireworks is started and while several fireworks are launched. Then, when the delay amount is calculated, and once the video is delayed based on the delay amount, the playback is maintained as it is.

Here, the case where the subject is fireworks has been described as an example, but of course, the present technology can be applied to other subjects as well.

For example, when watching a soccer match at a soccer stadium, the video at the moment when a ball is kicked is delayed so that the video at the time when the ball is kicked and the sound produced at that time are synchronized.

Further, for example, by delaying the video at the moment when a ball is hit in a baseball field, the video when the ball is hit and the hitting sound at that time are synchronized.

The present technology can be applied to competitions other than soccer and baseball matches, such as table tennis and volleyball, and for example, the present technology can be applied when the hitting sound and the video when the hitting sound is produced are synchronized.

Figure 9:
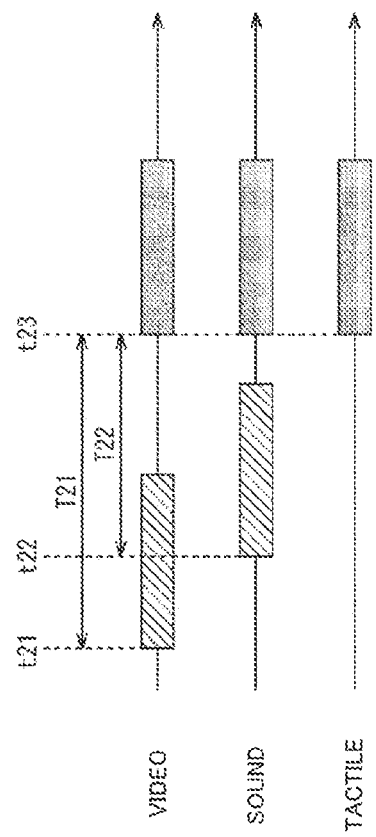
FIG. 9 is a diagram for explaining a case where video and sound are delayed.

Here, the case where the video is delayed and the sound is not delayed has been described as an example. However, when the content processing device 12 used by the user is provided with the sound presentation device 14 (FIG. 1), and a sound collecting device (not shown) such as a microphone, the sound may also be delayed as shown in FIG. 9.

The content processing device 12 photographs, for example, fireworks with the camera 51 (FIG. 5). It is assumed that the fireworks bloom at time t21 and the blooming fireworks are photographed by the camera 51. When the fireworks bloom at time t21, the sound produced at that time reaches the user at time t22. If the content processing device 12 presents the video and sound without any processing, the video of the fireworks that bloomed is presented from time t21, and the sound when the fireworks bloom at time t22 is presented.

The content processing device 12 presents the video of the blooming fireworks to the user at time t23 when only the period T21 has elapsed from time t21. The content processing device 12 presents the user with the sound when the fireworks bloom at time t23 when only the period T22 has elapsed from time t22. That is, the content processing device 12 delays the start of the presentation of the video and the sound until time t23, and then starts the presentation.

By delaying both the video and the sound in this way, it is possible to present the video and the sound to the user in a state where the video and the sound are synchronized. For example, it can be applied to cases where the content can be sufficiently analyzed, such as broadcast content.

The content processing device 12 masks the video for a period from time t21 to time t23. The content processing device 12 also masks the sound for a period from time t22 to time t23. The processing related to the video is performed in the same manner as in the above-described case.

In the sound processing, the sound collected by the microphone at time t22 is once recorded, and the recorded sound is played at time t23.

Further, from time t22 to time t23, an external sound (in this case, the sound of fireworks) is erased by generating a sound having a phase opposite to the frequency of the collected sound. Sound can be masked by applying a technology used in the so-called noise canceler. Alternatively, processing may be applied such that the sound is not interrupted by reproducing the sound recorded before time t22 again.

As shown in FIG. 9, when the tactile sensation is provided by the tactile presentation device 15 (FIG. 1), the presentation is started from time t23. That is, in this case, the tactile sensation (vibration) is presented to the user in synchronization with the video and the sound.

Second Processing for Synchronization of Video and Sound

The second processing related to the synchronization of video and sound will be described.

In the first processing related to the synchronization of the video and the sound, for example, the case where, when watching the fireworks in real time, the video and the sound when the fireworks bloom are synchronized and presented to the user has been described as an example. In the first processing, as described with reference to FIG. 9, even when the video and sound are delayed, the case where there is only one sound source has been described as an example.

As the second processing for synchronization of the video and the sound, a case where the video and the sound are delayed, and there are a plurality of sounds will be described as an example. Here, the case where the fireworks bloom will be described as an example.

For example, when watching fireworks, the sounds include the sound when the fireworks bloom and the sound (joyful sound) produced from the spectators around the user. As described with reference to FIG. 6, a case where the video when the fireworks bloom is delayed so as to be synchronized with the sound when the fireworks bloom will be considered. It is thought that the spectators around the user make the joyful sound when the fireworks bloom.

If the video when the fireworks bloom is delayed, the user will be presented with the video when the fireworks bloom after hearing the the joyful sound of the spectators around the user. In other words, the user hears the joyful sound of the spectators (hereinafter, appropriately referred to as the spectators sound) when the image is masked and the fireworks cannot be seen. The offset between the blooming of the fireworks and the spectators sound may cause the user to feel a sense of strangeness and contribute to the loss of realism.

Therefore, as described with reference to FIG. 10, the content processing device 12 performs the processing. In this example, it is assumed that the content processing device 12 is a wearable device such as AR glasses.

The content processing device 12 photographs fireworks with the camera 51 (FIG. 5). It is assumed that the fireworks bloom at time t31 and the blooming fireworks are photographed by the camera 51. When the fireworks bloom at time t31, the sound produced at that time (referred to as fireworks sound as appropriate) reaches the user at time t32.

The spectators sound when the fireworks bloom reaches the user at time t31. Here, the case where the spectators sound is the sound of spectators close to the user and reaches the user without delay will be described as an example. The spectators sound includes the sounds from the spectators who are close to the launch location of the fireworks and from the spectators far from the user, and in such a case, the spectators sound may reach the user at time t32 as in the case of the fireworks sound.

That is, since the arrival time of the spectators sound to reach the user is different depending on the distance from the user, the delay amount of the spectators sound, which will be described later, is different depending on which sound will be processed. Therefore, the distances of individual spectators sounds (individual subjects) may be estimated, and the delay amount may be set for each of those spectators sounds. Although the individual spectators sounds are used here, sounds other than the spectators sounds can also be processed.

There is an offset of period T31 (=time t32−time t31) between the time when the image arrives at the user and the time when the fireworks sound arrives. The content processing device 12 shifts the video by this offset and presents it to the user. That is, in this case, the content processing device 12 provides the user with the video photographed by the camera 51 from time t32. In the period from time t31 to time t32, the video is masked so that the video is not supplied to the user.

When the video arrives at the user, the spectators sound also arrives, but unless this spectators sound arrives at the same time as or shortly after the fireworks sound, the user may feel a sense of strangeness. Therefore, in this case, the content processing device 12 presents the spectators sound to the user by shifting the same by the period T31. That is, in this case, the content processing device 12 presents the spectators sound collected by the sound collecting device (not shown) such as a microphone to the user from time t32. In a period (T31) from time t31 and time t32, the spectators sound is masked so that the spectators sound is not presented to the user.

By performing such processing, in the period from time t31 and time t32, for example, the video and sound that were photographed and recorded before time t31, and before the fireworks went up are presented to the user. Then, at time t32, the video and sound of the fireworks that bloomed at time t31 are presented to the user. Then, at time t32, the joyful sound of the spectators who are delighted by the fireworks that bloomed at time t31 also reaches the user.

Therefore, the user is simultaneously provided with the video and sound of the fireworks that bloomed at time t32, and the spectators sound. By providing the video and sound at the same time in this way, the user can experience a more realistic feeling, and a spontaneous experience with less strangeness becomes possible.

Figure 10:
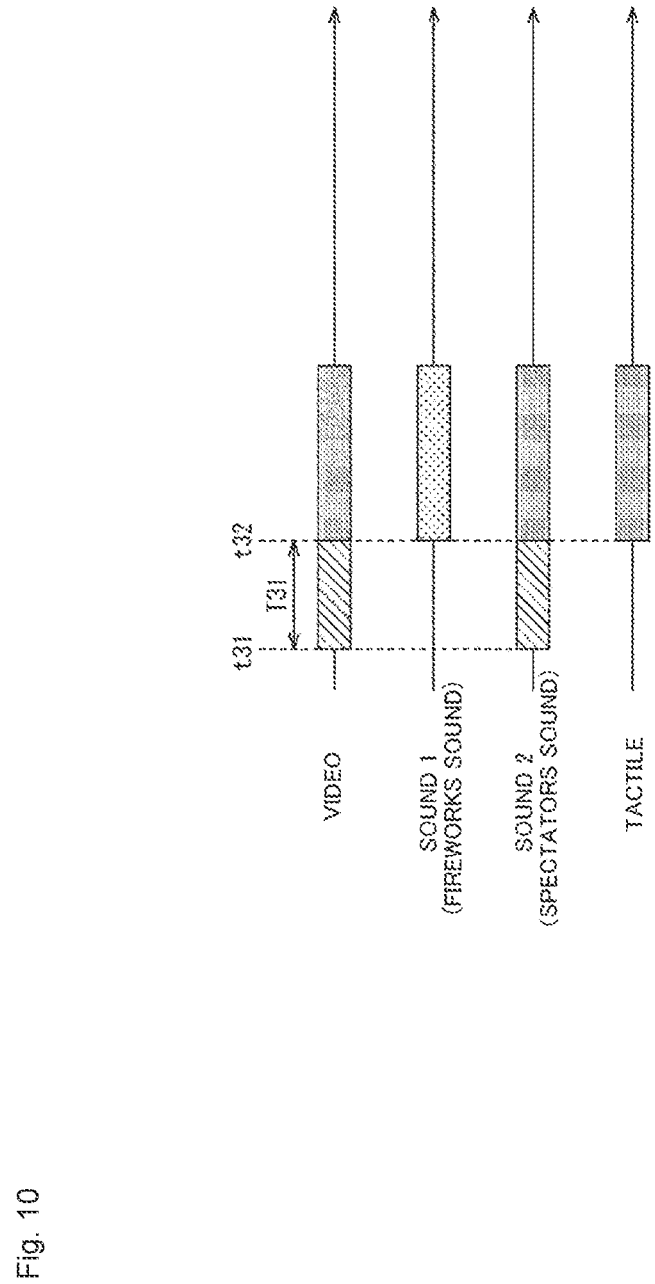
FIG. 10 is a diagram for explaining a case where video and sound are delayed.

As shown in FIG. 10, when the tactile sensation is provided by the tactile presentation device 15 (FIG. 1), the presentation starts at time t32. That is, in this case, the tactile sensation (vibration) is presented to the user in accordance with the sound. Although not shown in FIG. 10, when a plurality of sounds are processed, the tactile sensations corresponding to the plurality of sounds may be presented. In the case of the example shown in FIG. 10, the tactile sensation corresponding to the fireworks sound and the tactile sensation corresponding to the spectators sound may be presented respectively.

The processing of the content processing device 12 that performs such processing will be described with reference to the flowchart shown in FIG. 11.

The processes of steps S51 to S54 are the same as the processes of steps S11 to S14 (FIG. 7), and the description is duplicated. Therefore, the description thereof will be omitted here. If it is determined in step S53 that the content includes a delay, the process proceeds to step S55.

In step S55, the sound source separation technique is applied to separate the sound sources. For example, fireworks sounds and spectators sounds are extracted from the sound collected by a microphone. While the sound source separation is being executed, in step S56, video and sound masking is executed.

The processing related to the sound source separation may be performed by the content analysis unit 32 (FIG. 2), and the sound control unit 35 may perform masking and delay processing using the result. The sound control unit 35 may execute processing related to sound source separation, masking, and delay.

Figure 12:
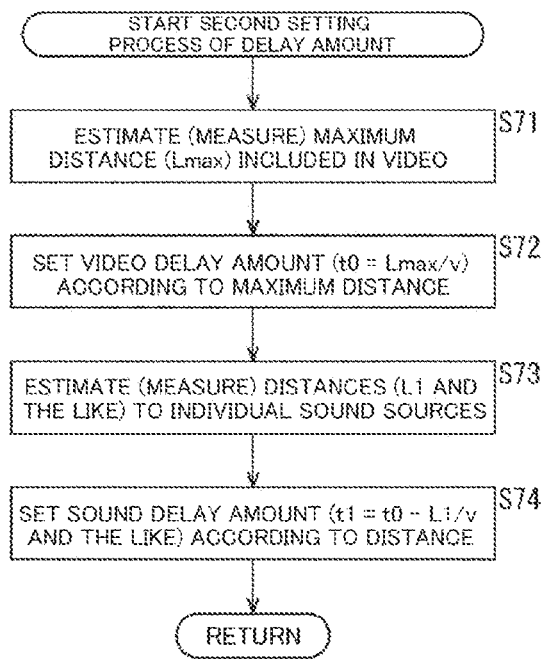
FIG. 12 is a flowchart for explaining details of a delay amount setting process.

While the video and sound masking is being executed, the delay amount setting process is performed in step S57. The delay amount setting process executed in step S57 will be described with reference to the flowchart of FIG. 12.

Since the processes of step S71 and step S72 are performed in the same manner as the processes of step S13 and step S32 (FIG. 8), the description thereof will be omitted. That is, in steps S71 and S72, the video delay amount is set.

In step S73, the distance to each sound source is estimated or measured. This process is performed for each sound source separated in step S55. In this case, since the fireworks sound and the spectators sound are extracted as the sound source, the distance to the sound source of the fireworks sound and the distance to the sound source of the spectators sound are estimated (measured) respectively. As described above, this estimation (measurement) may be performed by measuring the distance with an array of microphones or measuring the distance with a Doppler sensor. Alternatively, the distance to the sound source may be estimated by analyzing the image from a stereo camera.

In addition, information obtained in advance may be used for estimation (measurement). For example, when arriving at a venue, the data of the 3D model of the venue may be downloaded, and the 3D model data may be used to estimate (measure) the distance to the sound source. In this case, the information on the position where the user watches can be acquired in advance (at the time before the actual watching starts), and if such information can be acquired, such information may also be used to calculate the distances to the user's position and the position of the sound source based on the 3D model data.

Here, the distance to the sound source of the fireworks sound is defined as the distance L1, and the distance to the sound source of the spectators sound is defined as the distance L2. When the distance to each sound source is obtained in step S73, the process proceeds to step S74.

In step S74, the sound delay amount corresponding to the distance is set. For example, the sound delay amount ti is calculated by the following equation (2).

Sound delay amount $ti$=(Video delay amount $t0$)−
 (Distance $Li$)/(Sound velocity $v$)     (2)

Equation (2) is an equation for calculating the sound delay amount ti by subtracting the value obtained by dividing the distance Li by the sound velocity v from the video delay amount t0.

For example, the delay amount of fireworks sound is calculated as follows.

Sound delay amount $t1$=Video delay amount $t0$−distance $L1$/sound velocity $v$ In this case, since the sound source of the fireworks sound is at the position where the fireworks have bloomed, the distance L1 is the distance to the fireworks and is the maximum distance Lmax. Therefore, (Distance L1)/(Sound velocity v) becomes (maximum distance Lmax)/(Sound velocity v), and as a result, it becomes the same value as the video delay amount t0. Therefore, the delay amount of the fireworks sound becomes 0. The fireworks sound is presented to the user without a delay.

For example, the delay amount of spectators sound is calculated as follows.

Sound delay amount $t2$=(Video delay amount $t0$)−
 (Distance $L2$)/(Sound velocity $v$)

In this case, since the spectators sound is intended for the spectators around the user, the position (periphery) where the user is present is the sound source, so that the distance L2 is a value close to 0 (in this example, 0). Therefore, (Distance L2)/(Sound velocity v) becomes 0. Therefore, the delay amount of the spectators sound is almost the same as the video delay amount t0. Since the video delay amount t0 is the period T31 in the example shown in FIG. 10, the sound of the spectators when the fireworks bloom is presented with a delay equivalent to the video when the video of the fireworks that bloomed is presented.

Figure 11:
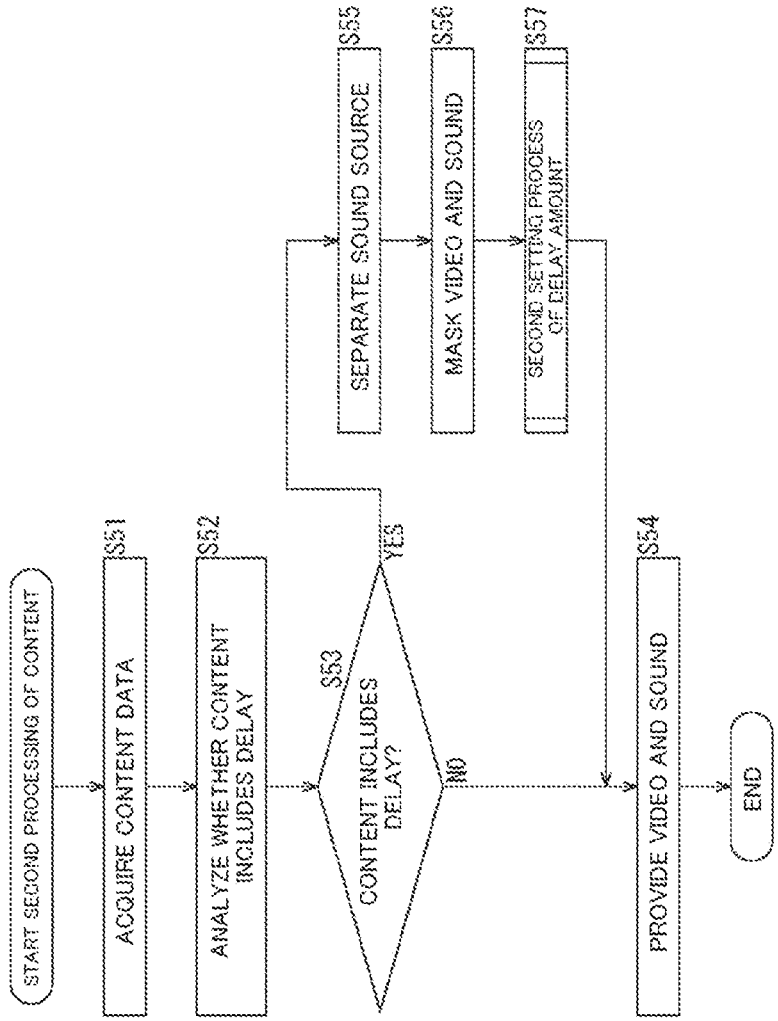
FIG. 11 is a flowchart for explaining the second processing of content.

When the sound delay amount is set in step S74, the process proceeds to step S54 (FIG. 11).

Here, it has been described that the sound delay amount is set by executing the processes of step S73 and step S74, in other words, according to the distance, but the sound delay amount may be set by another method (calculation formula).

For example, the subject and the delay amount may be set in advance, the delay amount set for the fireworks may be applied when the subject is determined to be fireworks, and the delay amount set for the spectators may be applied when the subject is determined to be the spectators.

In step S54, the video is delayed by the video delay amount t0, the sound is delayed by the sound delay amount ti, and the video and sound are presented to the user.

In this way, the video and sound are appropriately delayed so that the user does not feel a sense of strangeness and does not experience the loss of realism.

In the second processing, the case where the subject is fireworks has been described as an example, but the same can be applied to other subjects as in the first processing. For example, when watching a soccer match at a soccer stadium, the video at the moment when a ball is kicked may be delayed so that the video at the time when the ball is kicked and the sound produced at that time may be synchronized. The sound of the spectators and the live sound may be delayed according to the distance.

Further, for example, by delaying the video at the moment when a ball is hit in a baseball field, the video when the ball is hit and the hitting sound at that time may be synchronized. The sound of the spectators and the live sound may be delayed according to the distance. The sound when the ball falls, the sound when it hits the fence, and the like may be delayed according to the distance.

Figure 13:
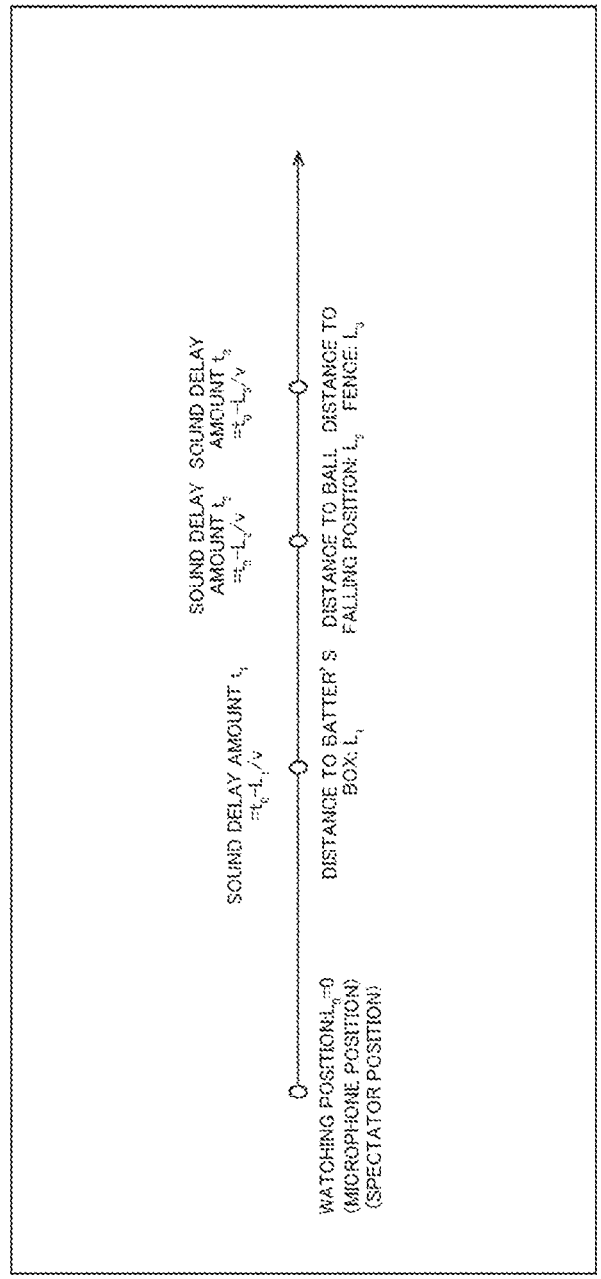
FIG. 13 is a diagram for explaining a sound delay amount setting method.

Here, the delay amount of sound when watching a baseball game (when a baseball game is being photographed) will be described. The position where the user is watching the game, that is, the position which is the watching position in FIG. 13, is defined as the position L0. This position L0 is the position where a microphone is installed and is also the position of the spectators. At the position L0, the distance from the user is 0.

The distance from the user's position L0 to the batter's box position is defined as the distance L1. The distance from the user's position L0 to the position where the ball has fallen is defined as the distance L2. The distance from the user's position L0 to the fence position is defined as the distance L3.

In the batter's box, the hitting sound when the batter hits the ball is delayed by the sound delay amount t1. The sound delay amount t1 is calculated as follows.

Sound delay amount $t1$=(Video delay amount $t0$)−
 (Distance $L1$)/(Sound velocity $v$)

When the batter hits the ball and the ball falls on the ground, the falling sound is delayed by the sound delay amount t2. The sound delay amount t2 is calculated as follows.

Sound delay amount $t2$=(Video delay amount $t0$)−
 (Distance $L2$)/(Sound velocity $v$)

The collision sound when the batter hits the ball and the ball hits the fence is delayed by the sound delay amount t3. The sound delay amount t3 is calculated as follows.

Sound delay amount $t3$=(Video delay amount $t0$)−
 (Distance $L3$)/(Sound velocity $v$)

As shown in FIG. 13, when distance L1<distance L2<distance L3, the sound delay amount is set such that sound delay amount t1<sound delay amount t2<sound delay amount t3. That is, the longer the distance, the larger the sound delay amount.

In this way, by finely adjusting the delay amount (correction amount) of the sound according to the distance, it is possible to better synchronize the timing of the video.

As described with reference to FIG. 13, the sound delay amount is set according to the distance, and the video delay amount is also set according to the distance as in the above-described case. By delaying both the video and the sound in this way, for example, it is possible to perform processing of significantly delaying (correcting) the video and finely adjusting the delay of the sound. In this way, it possible to more appropriately synchronize the video and sound.

When Processing Broadcast Content

The first and second processing related to the synchronization of video and sound described above can also be applied when the content is broadcast content.

By applying the present technology, for example, during a baseball broadcast, it is possible to broadcast a sound that is synchronized with the video. In the case of a baseball broadcast, the position where the camera is located and, for example, the batter's box are located at a distance, but what is photographed and broadcast by the camera is an enlarged video of the batter standing in the batter's box.

Since the batter's box and the camera (microphone) are located far apart, the hitting sound when the batter hits the ball may not be synchronized with the enlarged video of the batter being broadcast.

As described with reference to FIG. 13, the position of the camera (microphone) may be set as the watching position L0, the video may be delayed in consideration of the distance L2 to the batter's box, and the hitting sound may also be delayed as necessary. In this way, it is possible to broadcast in a state where the sound is synchronized with the video when the ball hits the bat.

The present technology can be applied not only when broadcasting in real time but also when broadcasting recorded content. For example, before broadcasting, the above-mentioned processing may be executed to edit the content so that the video and sound are synchronized, and the edited content may be broadcast.

When the content processing device 12 processes the broadcast content, the delay amount may be transmitted and received as information associated with the broadcast content. For example, when the broadcast content is a content obtained by photographing fireworks, information indicating that the fireworks sound is to be delayed by 1 second and the spectators sound is to be delayed by 0.1 seconds is transmitted and received as information associated with the broadcast content (the information may be described in in the information transmission format and transmitted and received).

The content processing device 12 may be configured to perform processing for delaying the video or sound using the information regarding the delay amount associated with such broadcast content. Further, a mechanism may be provided in which whether such a delay is actually performed can be set on the content processing device 12 side. For example, a mechanism may be provided in which whether or not to execute the delay processing is set by the user.

When the broadcast content is content that is photographed (collected) in real time and broadcast, such as a baseball broadcast, it is necessary to consider the broadcast time. In the case of broadcasting, the broadcasting start time and the broadcasting end time are set, and it is necessary that the playback of the content fits between them. This is the same even when the content is not such content that is photographed (sound-collected) and broadcast in real time, such as a baseball broadcast.

When processing such as delaying the video and delaying the sound as necessary is executed, the video may be masked at the start of the broadcast, or the video that cannot be broadcast may remain at the end of the broadcast.

Figure 14:
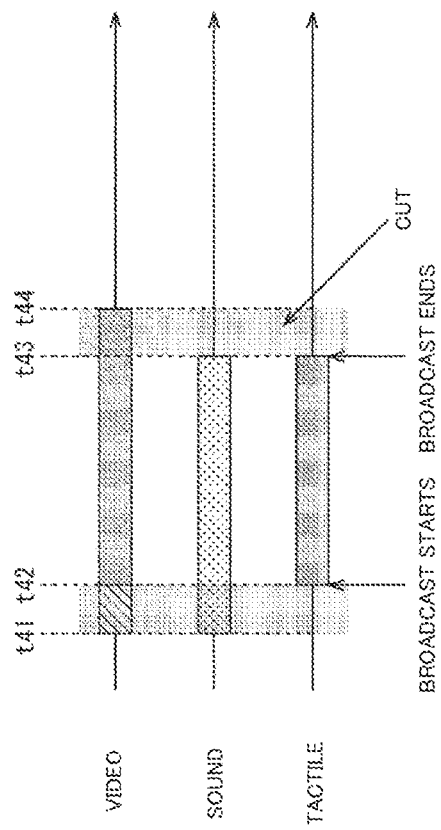
FIG. 14 is a diagram for explaining a processing example of broadcast content.

Therefore, the processing as shown in FIG. 14 may be performed. When the broadcast start time is set to time t42, photographing starts from time t41 before the broadcast start time t42. The video photographed at time t41 is delayed until time t42, and broadcasting starts from time t42. As for the sound, the sound collected from time t42 at the start of broadcasting is broadcast as it is.

If the broadcast end time is time t43, the sound ends at the end of the broadcast. Since the video is broadcast in a delayed state, at the time of the broadcast end time t43, the video that was photographed at a time (referred to as time t43') before time t43 is broadcast. The video photographed between time t43' and time t43 is cut.

In the example shown in FIG. 14, the broadcast section is from the beginning of the video to the end of the sound. When the tactile sensation is presented, the presentation is performed within this broadcast section.

Other processing during broadcasting will be described with reference to FIG. 15. The video is played slowly from the broadcast start time t51 to time t52. As for the sound, the collected sound is broadcast as it is from the broadcast start time t51.

The video is fast-forwarded and played from time t53 before the broadcast end time t54. As for the sound, the collected sound is broadcast as it is until the broadcast end time t54.

Figure 15:
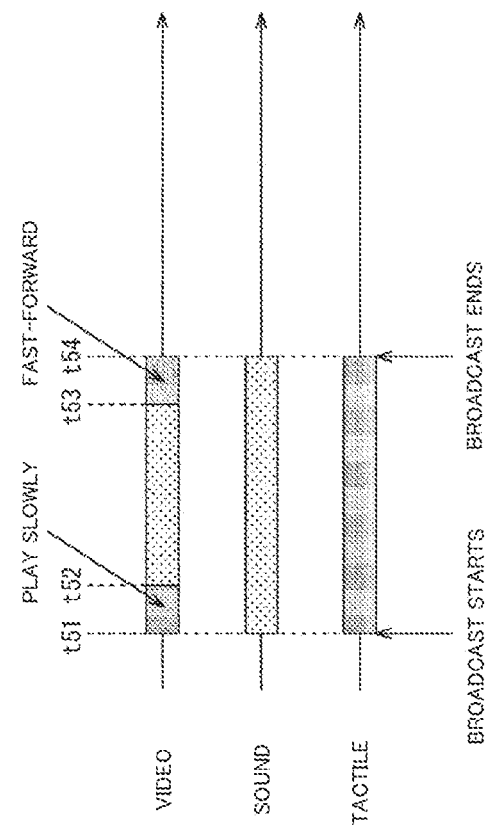
FIG. 15 is a diagram for explaining a processing example of broadcast content.

In the example shown in FIG. 15, the beginning of the video is played slowly, the end of the video is fast-forward played, and the other section is played in a delayed manner. The entire section of sound from the beginning to the end is the broadcast section. When the tactile sensation is presented, the presentation is performed within this broadcast section.

In the case of broadcast content, the side that transmits the content, for example, the content distribution device 11 shown in FIG. 1, may execute the first processing or the second processing related to the synchronization of the video and sound described above, and may execute the processing described with reference to FIG. 14 or FIG. 15. In this case, some of the functions of the content processing device 12 shown in FIG. 2 may be provided in the content distribution device 11.

Alternatively, the content processing device 12 may execute the first processing or the second processing related to the synchronization of the video and sound described above, and may also execute the processing described with reference to FIG. 14 or FIG. 15. When the content processing device 12 executes the processing, the content processing device 12 may be supplied with information that the content includes a delay from the content distribution device 11. Then, when such information is received, the content processing device 12 may execute the above-mentioned processing.

As described with reference to FIG. 9, when both the video and the sound are delayed to synchronize the video and the sound, and such content is broadcast, the delay may be significantly increased to, for example, 30 seconds. If it is possible to delay significantly, the delay amount may be set after sufficient analysis, and the content delayed according to the delay amount may be generated and provided to the user side. When such content is sufficiently analyzed, it becomes possible to generate an appropriate tactile sensation (vibration or the like).

When Processing VR Content

The first processing and the second processing related to the synchronization of video and sound described above can be applied even when the content is VR (Virtual Reality) content.

By applying the present technology, for example, when a baseball broadcast is distributed as VR content, it becomes possible to provide content in which the video and sound are synchronized. In the case of VR content, it can be provided so that there is an offset between the video and the sound in order to give a realistic feeling. Here, a process of providing a baseball broadcast described with reference to FIG. 13 so that there is an offset between the video and the sound will be described by taking the case where the baseball broadcast is provided as VR content as an example.

Figure 16:
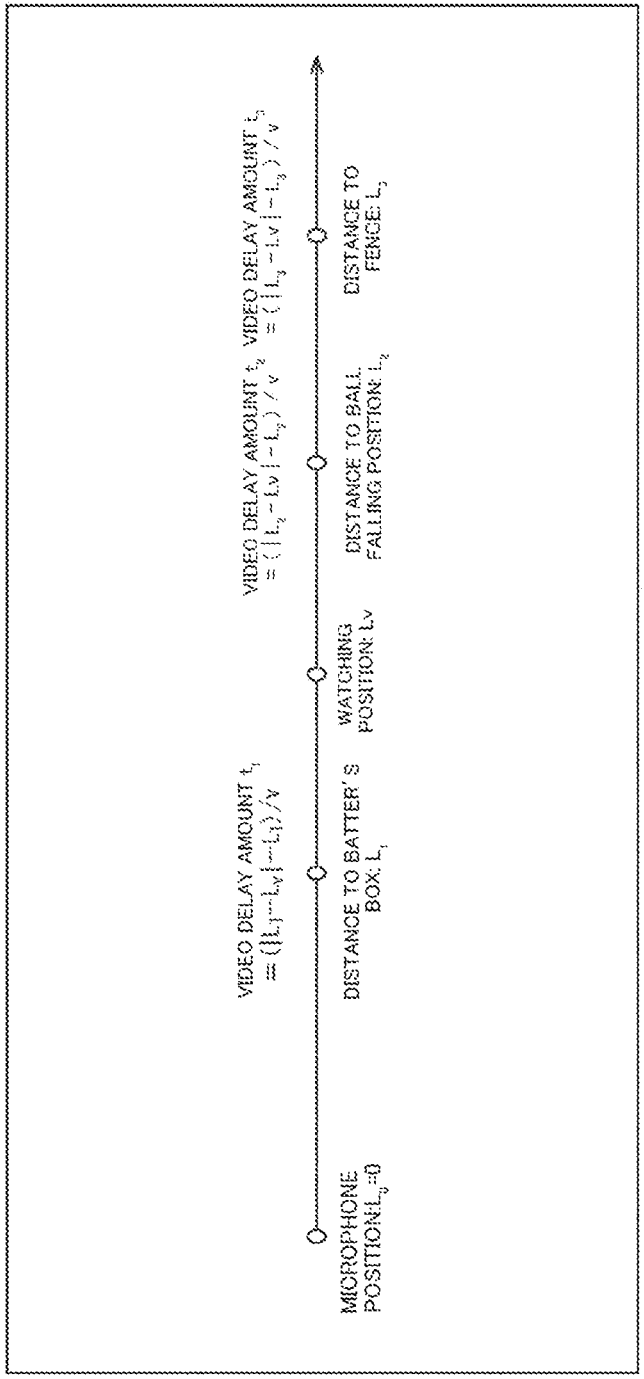
FIG. 16 is a diagram for explaining a processing example of VR content.

In FIG. 16, the position of the microphone is set as the position L0. The distance from the position L0 of the microphone to the position of the batter box is defined as the distance L1, the distance to the position where the ball has fallen is defined as the distance L2, and the distance to the position of the fence is defined as the distance L3.

If the VR content is designed so that the user can move around in a space, for example, in this case, the user can be located in the ground and watch the game from the ground. In FIG. 16, the watching position is defined as the watching position Lv, which is the position between the batter's box and the ball falling position. The distance from the microphone position L0 to the watching position Lv is defined as the distance Lv.

In the batter box, the video corresponding to the hitting sound when the batter hits the ball is delayed by the video delay amount t1. The video delay amount t1 is calculated as follows.

Video delay amount $t1 = (|\text{Distance } L1 - \text{Distance } Lv| - \text{Distance } L1)/(\text{Sound velocity } v)$ In this case, the video delay amount t1 is obtained by subtracting the distance L1 from the absolute value of the difference between the distance L1 and the distance Lv and dividing the subtracted value by the sound velocity v.

The video corresponding to the falling sound when the batter hits the ball and the ball falls on the ground is delayed by the video delay amount t2. The video delay amount t2 is calculated as follows.

Video delay amount $t2 = (|\text{Distance } L2 - \text{Distance } Lv| - \text{Distance } L2)/(\text{Sound velocity } v)$ In this case, the video delay amount t2 is obtained by subtracting the distance L2 from the absolute value of the difference between the distance L2 and the distance Lv, and dividing the subtracted value by the sound velocity v.

The video corresponding to the collision sound when the batter hits the ball and the ball hits the fence is delayed by the video delay amount t3. The video delay amount t3 is calculated as follows.

Video delay amount $t3 = (|\text{Distance } L3 - \text{Distance } Lv| - \text{Distance } L3)/(\text{Sound velocity } v)$ In this case, the video delay amount t3 is obtained by subtracting the distance L3 from the absolute value of the difference between the distance L3 and the distance Lv, and dividing the subtracted value by the sound velocity v.

According to the calculation formula shown in FIG. 16, a positive value or a negative value is calculated as the video delay amount t. If it is a positive value, the start of playback is shifted to a time after the time set as the start time of video playback. If it is a negative value, the start of playback is shifted to a time before the time set as the start time of video playback.

In the case of VR content created in a state where the video and sound are synchronized, by shifting the playback start time of the video before or after the set playback start time, it becomes possible to give an offset like the real space to the user in the virtual space. As described with reference to FIG. 16, the offset amount can be finely adjusted according to the distance.

As the VR content, the case of watching a baseball game has been described as an example, but the present technology can be applied to other contents as well.

Other Application Examples

In the above-described embodiment, the case of watching fireworks or the case of watching sports such as a baseball game has been described as an example of content, but the present technology can be applied to other contents other than these contents. That is, the present technology can be applied regardless of the content.

In a stadium where games such as a baseball game are played, there are stands called VIP rooms, and there are rooms that are fitted with glass and have a structure that makes it difficult for outside sounds to be transmitted. For a user watching a game in such a room, the sound collected outside the room may be output and provided to the user by a device such as a speaker in the room. In this case, the microphone that collects sound is installed near the sound source. By providing the user with the sound collected by the microphone installed near the sound source, it is possible to synchronize the video and the sound.

When the sound collected by a sound collecting device such as a microphone is provided to the user in this way, the sound from the real world is canceled. When the collected sound is provided to the user, some effect may be applied to the provided sound so that the sound to which the effect is applied is provided to the user.

For example, when providing the user with the sound collected by the microphone installed near the batter's box, a mechanism may be provided to apply an effect to the sound when the batter swings in the air to produce a flashy effect. A CG effect may be superimposed on the glass and provided to the user who is watching the game in the above-mentioned glass-walled room or the like.

A sound collecting device such as a microphone may be installed near the sound source to provide the user with the collected sound, and the content in which the collected sound and the video are synchronized may be provided to the user. In this case, the video and the sound may be acquired separately, the video may be delayed (fine-tuned) to be synchronized with the sound, and the content in which the sound and the video are synchronized may be provided to the user.

In addition, when the sound is provided to the user by a sound output device such as a speaker, the sound may be converted into a sound in a band that is easy for the user to hear, the user's favorite sound quality (male sound, female sound, favorite singer's sound, or the like), or a sound that feels like speaking in the ear and be provided to the user.

The present technology can be applied to, for example, a case where a user wears AR glasses, which is a wearable device shown in FIG. 5, at a live venue and enjoys a live performance. At the live venue, the sound is heard by the user as a live sound (sound that is not processed by the content processing device 12 and is directly heard by the user), and the video is provided by the content processing device 12 with a delay. For example, the time taken for the sound to reach is different depending on the position of the spectators due to the difference in the distance between the stage and the position of the spectators. However, by absorbing such a difference, people in the venue can enjoy the same video and sound at the same timing.

In addition, live performance is divided into performances and chats called MCs. The delay method may be switched between performance and MC. For example, the delay time may be different between performance and MC, for example, the performance and the MC may be provided with or without delay. The mode of delaying the video and the mode of delaying the audio may be switched depending on which one of performance and MC you want to experience live. Further, such switching may be set by the user.

In the above-described embodiment, for example, a case where the user wears AR glasses, which is a wearable device shown in FIG. 5, and watches a baseball game or the like has been described as an example. For example, when watching a baseball game, the ball may jump into the spectators' seats. A user who applies the present technology to watch a delayed video may not notice that the ball is flying even if the ball flies toward the user.

In order to avoid such a danger, when a danger is detected, a mechanism may be provided so that the display of the delayed video is stopped and the video is switched to the real-time video. For the detection of danger, a mechanism may be provided in which the content processing device 12 analyzes the video being photographed and, for example, detects the danger when the ball is photographed in a large size and it is determined that the ball is approaching. For the detection of danger, a mechanism may be provided in which a device installed in the venue detects the danger, and a signal notifying of the danger is transmitted from the device to the user's terminal (content processing device 12).

Recording Medium

The above-described series of steps of processing may be performed by hardware or software. When the series of steps of processing is performed by software, a program of the software is installed in a computer. Here, the computer includes a computer embedded in dedicated hardware or, for example, a general-purpose personal computer capable of executing various functions by installing various programs.

Figure 17:
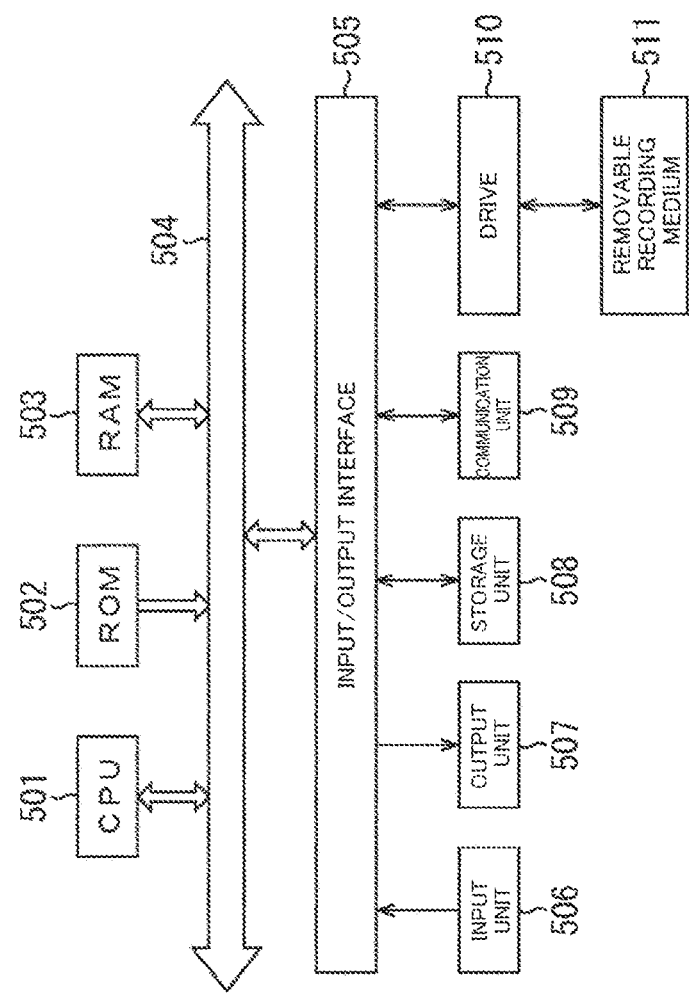
FIG. 17 is a diagram illustrating a configuration example of a personal computer.

FIG. 17 is a block diagram showing a configuration example of hardware of a computer that executes the series of processing described above according to a program. In the computer, a central processing unit (CPU) 501, read only memory (ROM) 502, and random access memory (RAM) 503 are connected to each other by a bus 504. An input/output interface 505 is further connected to the bus 504. An input unit 506, an output unit 507, a storage unit 508, a communication unit 509, and a drive 510 are connected to the input/output interface 505.

The input unit 506 is a keyboard, a mouse, a microphone, or the like. The output unit 507 is a display, a speaker, or the like. The storage unit 508 is a hard disk, non-volatile memory, or the like. The communication unit 509 is a network interface or the like. The drive 510 drives a removable recording medium 511 such as a magnetic disk, an optical disc, a magneto-optical disk, or a semiconductor memory.

In the computer that has the above configuration, for example, the CPU 501 performs the above-described series of processes by loading a program stored in the storage unit 508 to the RAM 503 via the input/output interface 505 and the bus 504 and executing the program.

The program executed by the computer (the CPU 501) can be recorded on, for example, the removable recording medium 511 serving as a package medium for supply. The program can be supplied via a wired or wireless transfer medium such as a local area network, the Internet, or digital satellite broadcasting.

In the computer, by mounting the removable recording medium 511 on the drive 510, it is possible to install the program in the storage unit 508 via the input/output interface 505. The program can be received by the communication unit 509 via a wired or wireless transfer medium to be installed in the storage unit 508. In addition, the program can be installed in advance in the ROM 502 or the storage unit 508.

Meanwhile, the program executed by the computer may be a program that performs processing chronologically in the order described in the present specification or may be a program that performs processing in parallel or at a necessary timing such as a calling time.

In addition, the system as used herein refers to an entire device configured by a plurality of devices.

Also, the advantageous effects described in the present specification are merely exemplary and are not intended as limiting, and other advantageous effects may be obtained.

Meanwhile, embodiments of the present technology are not limited to the above-described embodiments, and various changes can be made without departing from the gist of the present technology.

Meanwhile, the present technology can also take the following configurations.

(1) An information processing device including: a determination unit that determines whether it is content in which sound is delayed with respect to video; and a processing unit that delays the video by a predetermined period and plays the video when the determination unit determines that it is the content in which the sound is delayed with respect to the video.

(2) The information processing device according to (1), wherein the processing unit delays and plays the video so that the video when a sound source produces the sound is synchronized with the sound.

(3) The information processing device according to (1) or (2), wherein the predetermined period corresponds to a period by which the sound is delayed.

(4) The information processing device according to any one of (1) to (3), wherein the predetermined period is set according to a distance to the sound source of the sound.

(5) The information processing device according to any one of (1) to (4), further including: a photographing unit that photographs the video, wherein the processing unit delays the video photographed by the photographing unit.

(6) The information processing device according to (5), wherein the sound is a sound that directly reaches the user, and the photographing unit photographs a video that directly reaches the user.

(7) The information processing device according to any one of (1) to (6), wherein the processing unit masks the video for a predetermined period.

(8) The information processing device according to any one of (1) to (7), wherein collected sound is separated into sound sources, and the processing unit delays and plays the sound according to a distance to the sound source separated by the sound source separation.
(9) The information processing device according to any one of (1) to (8), wherein a start time and an end time are set for the content, and a video photographed at a time point before the start time is played from the start time.
(10) The information processing device according to any one of (1) to (8), wherein a start time and an end time are set for the content, the content is played slowly in a predetermined period from the start time, and is fast-forward played in a predetermined period before the end time.
(11) The information processing device according to any one of (1) to (10), wherein the content is VR (Virtual Reality) content, and the processing unit plays the video by delaying the video by a predetermined period according to a distance between a position where a user watches the video in a virtual space and a position where the sound of the content is collected.
(12) The information processing device according to any one of (1) to (11), which presents a tactile sensation that is synchronized with the sound.
(13) An information processing method for causing an information processing device that processes a video to execute: determining whether it is content in which sound is delayed with respect to video; and delaying the video by a predetermined period and plays the video when it is determined that it is the content in which the sound is delayed with respect to the video.
(14) A program for causing a computer to execute: determining whether it is content in which sound is delayed with respect to video; and delaying the video by a predetermined period and plays the video when it is determined that it is the content in which the sound is delayed with respect to the video.

REFERENCE SIGNS LIST

11 Content distribution device
12 Content processing device
13 Video presentation device
14 Sound presentation device
15 Tactile presentation device
31 Content acquisition unit
32 Content analysis unit
33 Delay processing unit
34 Video control unit
35 Sound control unit
36 Tactile control unit

The invention claimed is:

1. An information processing device, comprising:
a central processing unit (CPU) configured to:
determine that it is content in which sound is delayed with respect to video, wherein the content is Virtual Reality (VR) content; and
delay the video by a specific period and play the video based on a determination that it is the content in which the sound is delayed with respect to the video, wherein the video is delayed based on a distance between a position where a user watches the video in a virtual space and a position where the sound of the content is collected.

2. The information processing device according to claim 1, wherein
the CPU is further configured to delay and play the video so that the video is synchronized with the sound based on production of sound by a sound source.

3. The information processing device according to claim 1, wherein
the specific period corresponds to a period by which the sound is delayed.

4. The information processing device according to claim 1, wherein
the specific period is set according to a distance to a sound source of the sound.

5. The information processing device according to claim 1, further comprising:
a photographing unit that photographs the video, wherein the CPU is further configured to delay the video photographed by the photographing unit.

6. The information processing device according to claim 5, wherein
the sound is a sound that directly reaches the user, and the photographing unit photographs a video that directly reaches the user.

7. The information processing device according to claim 1, wherein
the CPU is further configured to mask the video for a specific period.

8. The information processing device according to claim 1, wherein
collected sound is separated into sound sources, and the CPU is further configured to delay and play the sound according to a distance to the sound sources separated by the sound source separation.

9. The information processing device according to claim 1, wherein
a start time and an end time are set for the content, and a video photographed at a time point before the start time is played from the start time.

10. The information processing device according to claim 1, wherein
a start time and an end time are set for the content, the content is played slowly in a first period from the start time, and is fast-forwarded during a second period before the end time.

11. The information processing device according to claim 1, wherein the information processing device presents a tactile sensation that is synchronized with the sound.

12. An information processing method for causing an information processing device that processes a video to execute:
determining that it is content in which sound is delayed with respect to video, wherein the content is Virtual Reality (VR) content; and
delaying the video by a specific period and playing the video based on a determination that it is the content in which the sound is delayed with respect to the video, wherein the video is delayed based on a distance between a position where a user watches the video in a virtual space and a position where the sound of the content is collected.

13. A non-transitory computer-readable medium having stored thereon, computer-executable instructions which, when executed by a computer, cause the computer to execute operations, the operations comprising:
determining that it is content in which sound is delayed with respect to video, wherein the content is Virtual Reality (VR) content; and
delaying the video by a specific period and playing the video based on a determination that it is the content in which the sound is delayed with respect to the video, wherein the video is delayed based on a distance between a position where a user watches the video in a virtual space and a position where the sound of the content is collected.

* * * * *